United States Patent [19]

Saigo et al.

[11] Patent Number: 5,244,701
[45] Date of Patent: Sep. 14, 1993

[54] FABRIC BASE PRESSURE SENSITIVE ADHESIVE TAPE USABLE AS RIBBON

[75] Inventors: Masahiro Saigo; Shigeo Uchida; Kamejiro Hamazaki; Tamie Asai, all of Kawasaki, Japan

[73] Assignee: Sliontec Corporation, Kawasaki, Japan

[21] Appl. No.: 944,700

[22] Filed: Sep. 14, 1992

[30] Foreign Application Priority Data

Jul. 27, 1992 [JP] Japan .................... 4-052535[U]

[51] Int. Cl.⁵ .................. D04D 7/06; B32B 7/12
[52] U.S. Cl. ........................ 428/4; 428/343; 428/261
[58] Field of Search ................ 428/4, 343

[56] References Cited

U.S. PATENT DOCUMENTS

| | | | |
|---|---|---|---|
| 1,900,900 | 3/1933 | Evans | 428/190 |
| 4,634,612 | 1/1987 | Nelson et al. | 428/4 |
| 4,713,267 | 12/1987 | Truskolaski | 428/4 |
| 4,826,716 | 5/1989 | Theno | 428/4 |

Primary Examiner—George F. Lesmes
Assistant Examiner—Blaine Copenheaver
Attorney, Agent, or Firm—McAulay Fisher Nissen Goldberg & Kiel

[57] ABSTRACT

Any ribbon used at present for packaging or decoration is constituted of a non-adhesive and slippery tape, and accordingly, in the case of performing ribbon-binding serving both as packaging and decoration or of fabricating corsage, if not with the greatest possible care, there often occurs getting out of shape on the way, thus taking a lot of time. To solve the above problems, the present invention provides a fabric base pressure sensitive adhesive tape usable as a ribbon characterized by forming the pressure sensitive adhesive layer on one surface of backing used as the ribbon, thereby easily sticking the ribbons to each other and also sticking the ribbon to the adherend to be adhesive-bonded for the decorative or packaging application.

2 Claims, 1 Drawing Sheet

FABRIC BASE PRESSURE SENSITIVE ADHESIVE TAPE USABLE AS RIBBON

TECHNICAL FIELD OF THE INVENTION

The present invention relate to a fabric base pressure sensitive adhesive tape usable as a ribbon having a construction of forming an pressure sensitive adhesive layer on one surface of a backing, and, particularly, to a fabric base pressure sensitive adhesive tape usable for a decorative or packaging ribbon.

BACKGROUND OF THE INVENTION

Recently, there have been used various ribbons for the decorative and packaging applications. However, any ribbon is constituted of a non-adhesive and slippery tape, and, accordingly, in the case of performing ribbon-binding serving both as packaging and decoration or of fabricating a corsage, if not with the greatest possible care, there often occurs getting out of shape on the way, thus taking a lot of time.

PROBLEMS TO BE SOLVED

The prior art relating to the decorative or packaging ribbon has the problems mentioned above.

An object of the present invention is to solve the problems of the above prior art, and, to provide a fabric base pressure sensitive adhesive tape usable as a ribbon having a construction of easily performing ribbon-binding or fabricating a corsage or the like.

SUMMARY OF THE INVENTION

The above object can be achieved by providing a fabric base pressure sensitive adhesive tape usable as a ribbon, characterized by forming an pressure sensitive adhesive layer on one surface of a backing used for the ribbon, thereby sticking the ribbons to each other and also sticking the ribbon to the adherend to be adhesive-bonded for the decorative or packaging application.

The backing material used as the above ribbon, preferably, comprises a fabric being satin-woven or taffeta-woven of acetate yarn. And, the pressure sensitive adhesive layer comprises an pressure sensitive adhesive mainly containing acrylic, silicone, natural rubber or synthetic rubber, which preferably has a removality or a permanent adhesiveness according as the application. And, as a release agent layer provided on the opposite side to the adhesive layer of the backing, there may be used such a material as silicone or non-silicon (for example, acrylic) release agent as exerting no effect on color, brightness and the like.

As a backing material suitable for decoration and packaging, there must be used a woven fabric having brightness and capable of being dyed in multi-colors. For example, the fabric being satin-woven or taffeta-woven of acetate yarn mentioned above is preferable. In addition, on one surface of the woven fabric, releasing treatment is applied preferably, as required.

And, the pressure sensitive adhesive needs to be selected from the acrylic group, silicone group, natural rubber group and synthetic rubber group depending on the ribbon type having removability or permanent adhesiveness.

Further, the coating method of the pressure sensitive adhesive is not particularly limited and may include full cating, stripe coating, dotted coating, dry edge coating (leaving both ends of the tape non-coated) or coating at only both ends.

Figure 1:
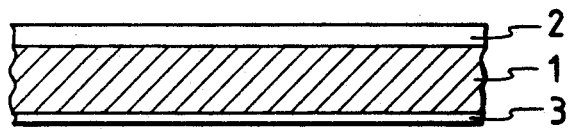
FIG. 1 is a cross-sectional view showing the construction of fabric base pressure sensitive adhesive tape usable as a ribbon according to the present invention.

1 ... backing, 2 ... pressure sensitive adhesive layer, 3 ... releasing treatment layer.

PREFERRED EMBODIMENT OF THE INVENTION

A fabric base pressure sensitive adhesive tape usable as a ribbon according to the present invention will be concretely described by way of embodiment.

FIG. 1 is a cross-sectional view showing a construction of a fabric base pressure sensitive adhesive tape as a ribbon according to the present invention, which includes backing 1, pressure sensitive adhesive layer 2 and a releasing treated layer 3 formed on the backing 1.

In this embodiment, an acetate satin-woven fabric having thickness of 200 $\mu$m was used as the backing 1, and acrylic pressure sensitive adhesive (full coating) having a thickness of 10–20 $\mu$m was used as the pressure sensitive adhesive layer 2. In addition, a the releasing treated layer 3, there was used a silicone releasing agent of emulsion type.

With the use of the pressure sensitive adhesive tape having the above construction, the packaging and the corsage-fabrication were made, and consequently, in any case, the working was simply completed with preferable workability. Also, it was possible to perform the packaging and sticking for curved or vertical surfaces, to conserve it in the packed state for a long period, and to endure impact to some extent.

As mentioned above, according to the present invention, it is possible to solve the problems of the prior art and to provide a fabric base pressure sensitive adhesive tape usable as a ribbon having a construction of performing ribbon-binding or easily fabricating a corsage or the like.

Also, with the tape so constructed as mentioned above, it is possible to easily create the packaging-form emphasizing the design.

What is claimed is:

1. A fabric base pressure sensitive adhesive tape usable as a ribbon, comprising a backing which is a fabric consisting of satin-woven or taffeta-woven acetate yarn, a pressure sensitive adhesive layer located on one surface of the backing used as the ribbon, the adhesive layer allowing said ribbon to be easily bonded to itself and also for adhering said ribbon to an adherend for decorative or packaging applications.

2. A fabric base pressure sensitive adhesive tape usable as a ribbon according to claim 1, wherein said pressure sensitive adhesive layer comprises a pressure sensitive adhesive mainly containing acrylic group, silicone group, natural rubber group or synthetic rubber group material, which has a removability or a permanent adhesiveness according to the application.

* * * * *